United States Patent
Kim et al.

(10) Patent No.: US 11,189,832 B2
(45) Date of Patent: Nov. 30, 2021

(54) PRECURSORS OF CATHODE MATERIALS FOR A RECHARGEABLE LITHIUM ION BATTERY

(71) Applicants: Umicore, Brussels (BE); Umicore Korea Ltd., Cheonan (KR)

(72) Inventors: Dae-Hyun Kim, Cheonan (KR); Jens Paulsen, Cheonan (KR); JinDoo Oh, Cheonan (KR); Maxime Blangero, Cheonan (KR)

(73) Assignees: UMICORE, Brussels (BE); UMICORE KOREA, LTD., Cheonan (KR)

( * ) Notice: Subject to any disclaimer, the term of this patent is extended or adjusted under 35 U.S.C. 154(b) by 0 days.

(21) Appl. No.: 16/568,756

(22) Filed: Sep. 12, 2019

(65) Prior Publication Data
US 2020/0017370 A1 Jan. 16, 2020

Related U.S. Application Data

(63) Continuation of application No. 16/488,717, filed as application No. PCT/EP2018/053051 on Feb. 7, 2018.

(30) Foreign Application Priority Data

Mar. 8, 2017 (EP) ..................................... 17159775
Apr. 20, 2017 (EP) ..................................... 17167192

(51) Int. Cl.
*C01G 51/00* (2006.01)
*H01M 4/525* (2010.01)
(Continued)

(52) U.S. Cl.
CPC ............ *H01M 4/525* (2013.01); *C01G 51/42* (2013.01); *H01M 4/523* (2013.01);
(Continued)

(58) Field of Classification Search
CPC ................................ C01G 51/06; C01G 51/42
See application file for complete search history.

(56) References Cited

U.S. PATENT DOCUMENTS 6,699,453 B1 * 3/2004 Gorge ..................... H01M 4/52
423/419.1
8,337,727 B2 12/2012 Chen et al.
(Continued)

FOREIGN PATENT DOCUMENTS

CN 1190947 A 8/1998
CN 102139929 A 8/2011
(Continued)

OTHER PUBLICATIONS

Machine translation CN 105731551 (Year: 2016).*
(Continued)

*Primary Examiner* — Alexandre F Ferre
(74) *Attorney, Agent, or Firm* — NK Patent Law (57) ABSTRACT

A method for manufacturing a cobalt based hydroxide carbonate compound having a malachite-rosasite mineral structure, comprising the steps of:
providing an first aqueous solution comprising a source of Co,
providing a second aqueous solution comprising $Na_2CO_3$,
mixing both solutions in a precipitation reactor at a temperature above 70° C., thereby precipitating a cobalt based hydroxide carbonate compound whilst evacuating from the reactor any $CO_2$ formed by the precipitation reaction, wherein the residence time of the compound in the reactor is between 1 and 4 hours, and
recovering the cobalt based hydroxide carbonate compound. The cobalt based hydroxide carbonate com-
(Continued)

pound is used as a precursor of a lithium cobalt based oxide usable as an active positive electrode material in lithium ion batteries.

15 Claims, 4 Drawing Sheets

(51) Int. Cl.
 *H01M 10/0525* (2010.01)
 *H01M 4/52* (2010.01)
 *H01M 4/02* (2006.01)

(52) U.S. Cl.
 CPC ..... *H01M 10/0525* (2013.01); *C01P 2002/54* (2013.01); *C01P 2002/72* (2013.01); *C01P 2002/74* (2013.01); *C01P 2002/85* (2013.01); *C01P 2004/32* (2013.01); *C01P 2004/51* (2013.01); *C01P 2006/11* (2013.01); *C01P 2006/12* (2013.01); *C01P 2006/40* (2013.01); *C01P 2006/80* (2013.01); *H01M 2004/028* (2013.01)

(56) References Cited

U.S. PATENT DOCUMENTS

| | | |
|---|---|---|
| 2004/0131530 A1 | 7/2004 | Gorge et al. |
| 2016/0218361 A1 | 7/2016 | De Palma et al. |

FOREIGN PATENT DOCUMENTS

| | | |
|---|---|---|
| CN | 102583585 A | 7/2012 |
| CN | 102891312 A | 1/2013 |
| CN | 105118991 A | 12/2015 |
| CN | 105731551 A | 7/2016 |
| GB | 1437192 A | 5/1976 |
| JP | 11505798 A | 5/1999 |
| JP | 2003313030 A | 11/2003 |
| JP | 4018138 B2 | 12/2007 |
| JP | 2010532075 A | 9/2010 |
| JP | 2020077613 A | 5/2020 |
| KR | 20160055189 A | 5/2016 |
| WO | 2009003573 A1 | 1/2009 |
| WO | 2018162165 A1 | 9/2018 |

OTHER PUBLICATIONS

JPO; Office Action for Japanese Patent Application No. 2019-548579 dated Oct. 5, 2020, 5 pages.

Yang, J., et al., "Synthesis and characterisation of cobalt hydroxy carbonate Co2CO3(OH)2 nanomaterials" Spectrochimica Acta Part A, Elsevier, 2011, vol. 78, pp. 420-428.

Perichiazzi, N., et al., "The malachite-rosasite group: crystal structures of Glaukosphaerite and Pokrovskite", European Journal of Mineralogy, 2006, vol. 18, pp. 787-792.

ISA/EP; International Search Report and Written Opinion for International Patent Application No. PCT/EP2018/053051 dated Mar. 23, 2018, 9 pages.

Mei, Jia, et al., "Preparation and characterization of high performance cathode material LiCoO2", China Academic Journal Electronic Publishing House, vol. 31, Nov. 2, 2007, 3 pages.

Gonzalez-Lopez, J , et al., "Crystallization of nanostructured cobalt hydroxide carbonate at ambient conditions: a key precursor of Co3O4", Mineralogical Magazine, vol. 80, No. 6, Oct. 2016, 17 pages.

\* cited by examiner

PRECURSORS OF CATHODE MATERIALS FOR A RECHARGEABLE LITHIUM ION BATTERY

CROSS-REFERENCE TO RELATED APPLICATIONS

This application is a continuation of U.S. application Ser. No. 16/488,717, filed Aug. 26, 2019, which is a National Stage Patent Application claiming the benefit of International Patent Application No. PCT/EP2018/053051, filed Feb. 7, 2018, which claims the benefit of European Patent Application No. 17167192.8, filed Apr. 20, 2017 and the benefit of European Patent Application No. 17159775.0, filed Mar. 8, 2017.

TECHNICAL FIELD AND BACKGROUND

This invention relates to a powderous cobalt based compound, applicable as a precursor of a cathode material in a rechargeable lithium ion battery, and to a process to use this precursor to prepare a cathode material for rechargeable lithium ion batteries. More particularly, the precursor compound is a cobalt based hydroxide carbonate based compound which is prepared by a precipitation process using sodium carbonate. In an embodiment, the precursor compound is additionally doped with elements such as Al, Mg, Mn, Ni etc. and, preferably the compound has a spherical morphology, which provides benefits for improved electrochemical performance and higher energy density.

Lithium cobalt oxide ($LiCoO_2$; referred to as LCO hereafter)—doped or un-doped—has been used as a cathode material in the rechargeable batteries of most commercial portable electronic applications, such as a mobile phone, tablet PC, laptop computer, and digital camera, due to its high energy density and good cycle life. LCO has a hexagonal $\alpha$-$NaFeO_2$ type structure (space group of R-3m), where layers of lithium ions are located between slabs of $CoO_6$ octahedron. Since the demand for smaller and lighter batteries which have a high energy density and good electrochemical properties has increased, lots of R&D groups are working on developing or improving cathode materials, especially LCO.

There are several ways to increase the volumetric energy density of a lithium ion battery such as applying a thinner current collector and separator, and using cathode and anode materials which have a higher packing density. The packing density of a cathode material mainly depends on two components:

first, the particle size distribution (referred to as PSD hereafter) of LCO is directly linked to the volumetric density because it determines how close particles can be packed in a limited volume. Generally, a higher D50 value (being the particle size of the median particle in a normal distribution) tends to enable a higher packing density. Furthermore, the D100 (or D99) value should be as low as possible, because big particles result in bad electrode coating quality, and damage to the current collector. The span, which is the value of (D90−D10)/D50), is a useful criterion to identify how similar in size the particles are, and defines the relative particle size of big particles compared to the D50. The smaller the span, the less large particle issues are expected, even if the D50 is large to obtain a large density.

second, the porosity in a single particle should be as low as possible to get a maximum density of a single particle.

LCO is synthesized using a lithium (Li) precursor (generally, $Li_2CO_3$) and a cobalt (Co) precursor (typically, $Co_3O_4$). There are two possibilities to obtain a target D50 value of LCO. One is to adjust the synthesis conditions such as sintering temperature, sintering time, and Li to Co ratio. For a sufficient high Li to Co ratio and sintering temperature, inter-particle sintering occurs and the D50 increases significantly. This allows to use non-shaped cobalt precursors, as their size is determined by the sintering conditions. A draw-back of this approach is that high sintering temperatures are required, which increases process costs and/or the obtained LCO has a high Li to Co stoichiometry, which is bad for electrochemical performance. This dilemma was discussed in detail in WO2009-003573.

An alternative approach is to use pre-shaped cobalt precursors, such as spherical $Co_3O_4$, as disclosed in US2015/0221945. The word "shaped" here refers to a precursor that already resembles the desired shape of the final LCO. This relaxes the sintering requirements. This approach is preferred because it is expected that the particle size of LCO is irregular—having a wider span—when a non-shaped cobalt precursor is used. Also, high temperature or high Li to Co ratio is mandatory to shape LCO from non-shaped cobalt precursor, requiring high energy consumption or additional heat treatment steps to get a stoichiometric LCO. The way to get the preferred morphology of LCO is to start a synthesis from shaped cobalt precursors that have a high D50 and narrow span. Having a high density and low porosity is a benefit as it further enhances the packaging density of the final LCO and reduces the sintering efforts. Shaped cobalt precursor should also have enough mechanical hardness not to be broken during processing, such as blending with the lithium precursor.

A cathode material is one of the most critical components which determine the electrochemical properties of lithium ion batteries. One way to increase the energy density of a lithium ion battery is to increase its working voltage by applying a higher charge voltage. However, as the state of charge increases by increasing the charge voltage, less lithium ions remain in the crystal structure, resulting in a thermodynamically unstable $CoO_2$. Thus, as a result of reactions of the delithiated cathode material with the electrolyte, cobalt can slowly be dissolved in the electrolyte at high voltage, which is referred to as cobalt dissolution, resulting in the failure of the battery. There have been tremendous efforts to reduce cobalt dissolution by means of doping LCO. Preferably, the dopant is already present and well distributed in the cobalt precursor before sintering, such as in CN102891312 A, CN105731551 A and CN102583585 B. This is because it is difficult to obtain good doping in large particles by a solid state approach where a shaped cobalt precursor is blended with the dopant. Full diffusion of dopant into the shaped particles of LCO requires a long sintering time or very high sintering temperatures. This especially applies for a synthesis process if the particle size is big, e.g. >10 μm, where the dopant is added during blending of lithium and cobalt precursors.

Cobalt precursors for LCO can be prepared by a precipitation process. For example, a solution having a certain concentration of a $CoSO_4$ and a solution having a certain concentration of NaOH are mixed in a reactor under controlled pH, where an impeller is rotating with a certain RPM. Consequently, solid cobalt hydroxide ($Co(OH)_2$) will be precipitated, which can be a cobalt source of LCO. However, there is a drawback when using $Co(OH)_2$ in that it is difficult to achieve a large D50 hydroxide because of certain particle growth limitations.

Compared to a Co(OH)$_2$ precipitation process, a CoCO$_3$ precipitation allows more easily to obtain large, spherical and dense cobalt precursors. For the precipitation, cobalt salts can be chosen from CoSO$_4$, CoCl$_2$, Co(NO$_3$)$_2$ or other water soluble cobalt salts, while bases can be selected from Na$_2$CO$_3$, K$_2$CO$_3$, NaHCO$_3$, KHCO$_3$, NH$_4$HCO$_3$ or other soluble carbonate or bicarbonate. Na$_2$CO$_3$, NaHCO$_3$ and NH$_4$HCO$_3$ are the three most widely used precipitation agents for CoCO$_3$.

Nowadays CoCO$_3$ is typically produced through a co-precipitation of a bicarbonate solution with a cobalt salt solution. If CoSO$_4$ is chosen as cobalt salt, a typical reaction equation is:

$$CoSO_4 + 2AHCO_3 \rightarrow CoCO_3 + A_2SO_4 + H_2CO_3, \text{ with } A=H \text{ or } NH_4 \quad (EQ\ 1)$$

If, for example, CoCl$_2$ is used as cobalt salt the reaction equation would accordingly be:

$$CoCl_2 + 2AHCO_3 \rightarrow CoCO_3 + 2ACl + H_2CO_3, \text{ with } A=Na, K, \text{ or } NH_4 \quad (EQ\ 2)$$

Additionally there will be side reactions as H$_2$CO$_3$ dissociates to H$_2$O+CO$_2$ or by NH$_3$ evolution for A=NH$_4$. A drawback of the bicarbonate process according to EQ1 and 2 above is that only 50% of the available —CO$_3$ is utilized in the product. 50% of the —CO$_3$ remains in solution or evaporates as CO$_2$.

In a typical NH$_4$HCO$_3$ process, when using CoSO$_4$, the basic reaction is:

$$CoSO_4 + 2NH_4HCO_3 \rightarrow CoCO_3 + (NH_4)_2SO_4 + CO_2 + H_2O \quad (EQ\ 3)$$

During the precipitation, CO$_2$ is continuously released from the reactor and (NH$_4$)$_2$SO$_4$ is generated as a by-product. It can be calculated that 1 kg CoCO$_3$ product needs 1.329 kg of NH$_4$HCO$_3$. Sulfur (S) and Nitrogen (N) are the main impurities in the obtained CoCO$_3$ product in this process. Because the (NH$_4$)$_2$SO$_4$ cannot be released to the environment, the waste water needs to be treated to remove—preferably to recycle—the ammonia. These ammonia recycling installations are expensive and increase the capital investment significantly, as well as the operating cost for the waste treatment, in particular by the higher need of energy.

In a process using NaHCO$_3$, when using CoSO$_4$ the reaction is:

$$CoSO_4 + 2NaHCO_3 \rightarrow CoCO_3 + Na_2SO_4 + CO_2 + H_2O \quad (EQ\ 4)$$

It can be calculated that 1 kg CoCO$_3$ product needs 1.413 kg of NaHCO$_3$. Compared with the NH$_4$HCO$_3$ process, there is no need to install an ammonia recovery system. However, the throughput of the NaHCO$_3$ process is an issue. Compared to the high solubility of NH$_4$HCO$_3$ (216 g/L at 20° C.), the solubility of NaHCO$_3$ is relative low (96 g/L at 20° C.). Therefore, higher flow rates of less concentrated NaHCO$_3$ are needed for the precipitation, which results in a relative low throughput of the CoCO$_3$ production. On the other hand, because the dissolution of NaHCO$_3$ is very slow, an independent dissolution/storage facility is necessary for mass production.

Another obvious approach is to use a carbonate for the precipitation. A typical reaction equation—if MSO$_4$ is used as salt—is:

$$MSO_4 + A_2CO_3 \rightarrow MCO_3 + A_2SO_4, \text{ with } A=Na, K \text{ or } NH_4 \quad (EQ\ 5)$$

However, WO2016-055911 teaches that—if M is Ni—Mn—Co— and A=Na or K— a MCO$_3$ precipitates that has a high content of alkali impurities.

This invention aims to provide an improved cobalt based precursor compound for a cathode material, and a manufacturing method to obtain a low impurity content in the final cathode material, which improves the electrochemical stability and increases the energy density of the cathode material, with a cheaper process cost.

SUMMARY

View from a first aspect, the invention can provide the use of a cobalt based hydroxide carbonate compound having a malachite-rosasite mineral structure as a precursor of a lithium cobalt based oxide usable as an active positive electrode material in lithium ion batteries. The compound may have the general formula $[Co_{1-a}A_a]_2(OH)_2CO_3$, A being either one or more of Ni, Mn, Al, Zr, Ti and Mg, with a≤0.05. In an embodiment A is Al or Mg, with 0.002≤a≤0.020, and Al or Mg is homogeneously doped in the compound. The compound may have an XRD pattern where the peak ratio P has a value <1, with P=P1/P2, P1 being the maximum peak intensity at 32~33 degree, and P2 being the maximum peak intensity at 34~35 degree. P might also be <0.8 or even <0.2 to yield a superior compound.

The same values for P can also be reached if the compound is part of a mixture comprising also cobalt carbonate. The cobalt carbonate may have a rhombohedral structure. The compound in the previous embodiments may further comprise Na as an impurity of up to 0.3 wt %. Also, the compound may have a particle size distribution with D50 between 15 and 25 μm or between 20 and 25 μm, and a span <0.80. Another PSD related characteristic may be that D99/D50<2. Furthermore the cobalt based hydroxide carbonate compound may have a spherical morphology and a tap density >1.8 g/cm$^3$.

Viewed from a second aspect, the invention can provide a method for manufacturing the cobalt based hydroxide carbonate compound of the first aspect of the invention, comprising the steps of:
providing an first aqueous solution comprising a source of Co,
providing a second aqueous solution comprising Na$_2$CO$_3$,
mixing both solutions in a precipitation reactor at a temperature above 70° C., thereby precipitating a cobalt based hydroxide carbonate compound whilst evacuating from the reactor any CO$_2$ formed by the precipitation reaction, wherein the residence time of the compound in the reactor is between 1 and 4 hours, and
recovering the cobalt based hydroxide carbonate compound. In a particular embodiment, the step of mixing both solutions can be performed in an open precipitation reactor to facilitate the evacuation of CO$_2$, and in another embodiment the open reactor can be exposed to the air. The residence time can further be limited to between 1 and 3 hours and the temperature to between 80 and 95° C.: taking into account water evaporation, the maximum reaction temperature may be limited to 95° C. In the method embodiments, the second aqueous solution may consist of either:
a solution of at least 2N Na$_2$CO$_3$, or
a solution consisting of between 0.5 and 3 mol/L of Na$_2$CO$_3$ and between 1 and 6 mol/L NaOH,
wherein the Na content in the Na$_2$CO$_3$ is as high or higher than twice the Na content in the NaOH. In an embodiment, the solution consists of between 1.5 and 2.5 mol/L of Na$_2$CO$_3$ and between 3 and 5 mol/L NaOH, wherein the Na content in the Na$_2$CO$_3$ is as high or higher than twice the Na content in the NaOH. In an embodiment the solution consists of >50 vol % of a 2 mol/L $Na_2CO_3$ solution and <50 vol % of a 4 mol/L NaOH solution. It may also be that the first aqueous solution further comprises a source of either one or more of Ni, Mn, Al, Mg and Ti. In a further embodiment, the solution comprising a source of Co comprises $CoSO_4$, and further comprises either one or more of $MgSO_4$, $Al_2(SO_4)_3$, $NiSO_4$ and $MnSO_4$, wherein either one or more of Mg, Al, Ni and Mn are present in a molar ratio versus the Co content of between 0.2 and 5 mol %. Another way to add the dopant A may be that during the step of mixing both solutions a nanometric powder consisting of either one or more of $TiO_2$, MgO and $Al_2O_3$ is added. In a particular method embodiment the step of recovering the cobalt based hydroxide carbonate compound comprises the substep of transferring the compound to a settlement reactor coupled to the precipitation reactor, and whereafter from the settlement reactor the settled compound is recirculated to the precipitation reactor.

The invention can also provide a method to manufacture a lithiated cobalt based oxide, comprising the steps of any one of the previous method embodiments, and subsequently comprising the steps of:

mixing the cobalt based hydroxide carbonate compound with a source of Li, and sintering the mixture at a temperature above 950° C. in an oxygen containing atmosphere. In this method, the precipitated cobalt based hydroxide carbonate compound may comprise Na as an impurity between 0.1 and 0.3 wt %, and wherein either:

during the step of mixing the cobalt based hydroxide carbonate compound with a source of Li, or during the step of sintering the mixture;

a sulfate compound is added, whereby the molar quantity of $SO_4$ is equal to or higher than the molar content of Na, and subsequently comprising the step of washing the lithiated cobalt based oxide with water, and drying the lithiated cobalt based oxide. Here, the sulfate compound may be either one of $Li_2SO_4$, $NaHSO_4$, $CoSO_4$ and $Na_2S_2O_8$.

DETAILED DESCRIPTION

The current invention discloses a cobalt compound useful as cobalt precursor of a cathode material for a rechargeable lithium ion battery. More specifically, this precursor is a cobalt hydroxy (or hydroxide) carbonate based compound. In the drawings and the following detailed description, preferred embodiments are described in detail to enable practice of the invention. Although the invention is described with reference to these specific embodiments, it will be understood that the invention is not limited to these preferred embodiments. To the contrary, the invention includes numerous alternatives, modifications and equivalents, as will become apparent from considering the detailed description and the accompanying figures.

This invention provides:
1) a cobalt precursor compound for a cathode material in rechargeable lithium ion batteries,
2) a method to produce this cobalt compound and
3) a method to produce the cathode material having a low impurity level, which is a benefit for improved electrochemical performance.

In the area of precursors for cathodes for rechargeable lithium batteries, precipitation is widely applied. Quite generally ammonia is added as chelating agent (for example to prepare $M(OH)_2$) or as part of the precursor salts (for example ammonium bicarbonate in the case of $CoCO_3$). Ammonia containing solutions are not stable, and especially at higher temperatures and higher pH they decompose rapidly and $NH_3$ gas evolves. Therefore it is standard practice to (1) use closed reactors and (2) avoid high temperatures to avoid a contamination of the air in the plant by ammonia.

It is assumed that under these process conditions a $CoCO_3$ precursor can also be precipitated through a $Na_2CO_3$ process and when using $CoSO_4$ the reaction theoretically is:

$$CoSO_4 + Na_2CO_3 \rightarrow CoCO_4 + Na_2SO_4 \quad (EQ\ 6)$$

It can be calculated that 1 kg $CoCO_3$ product only needs 0.892 kg of $Na_2CO_3$, which is much less than when using $NaHCO_3$ and $NH_4HCO_3$. Since $Na_2CO_3$ is cheaper than $NaHCO_3$ and $NH_4HCO_3$, the $Na_2CO_3$ precipitation process is more attractive from a cost point of view. The main problem for a $Na_2CO_3$ process is generally the high sodium impurity in the final obtained $MCO_3$ product. In a typical $Na_2CO_3$ process, sodium reaches several thousand ppm, sometimes even 10000 ppm in the final obtained $CoCO_3$ precursor. High impurities levels will result in a poor electrochemical performance of the obtained LCO, especially a low reversible capacity. New strategies need to be applied to solve the sodium impurity problem in $CoCO_3$ precursor products. Besides impurities in general, a particular issue is that in a standard precipitation, no high quality precipitate is achieved. Typically the precipitate of a $CoSO_4+Na_2CO_3$ precipitation has a poor morphology and a very low density.

The invention discloses that a cobalt based hydroxide carbonate compound can be produced by using a $Na_2CO_3$ precipitation process that is performed at high temperature under agitation, and ensuring that any $CO_2$ that is formed is evacuated from the reactor mixture. The invention combines the following aspects:

1) Based on a $Na_2CO_3$ precipitation process, which is cost-efficient, a spherical dense cobalt compound which has narrow span can be prepared: the median particle size (D50) of the precipitated cobalt hydroxide carbonate can be easily above 20 μm with a span below 0.8. Due to the feature of a spherical dense cobalt compound which has a narrow span, the cathode material (LCO) can have also have a higher density and narrower span.

2) A dopant (Ni, Mn, Nb, Al, Mg, Ti, Zr, and etc.) can be homogeneously distributed in the crystal structure of the cobalt precursor compound with atomic scale distribution, since the dopant is added during the precipitation process. Surprisingly, doping of 3-valent aluminum into the structure of the cobalt compound is possible. Additionally, contrary to other processes, doping of Mg is possible as well. Besides of atomic scale distribution, nano-particle doping can be applied as well (for example for $TiO_2$). As aluminum suppresses the structural changes at high voltage, the influence of cobalt dissolution on the electrochemical properties of the final lithiated cobalt based oxide can be mitigated. Doping of manganese in a cobalt precursor can stabilize the crystal structure of LCO resulting in the improved cycleability as well as the power performance of LCO. Nickel doping can increase the capacity of LCO.

3) The sodium impurity can be generally suppressed in the cobalt hydroxide carbonate compound. However, in some conditions, a Na impurity remains after the precipitation, which can be removed by an intermediate washing step after addition of sulfur or chlorine compounds, followed by a drying step.

Surprisingly, in these conditions a precipitate of high quality can be achieved, related to the surprising discovery that the high quality precipitate is not a cobalt based carbonate but rather a cobalt hydroxide carbonate. In order to precipitate a cobalt hydroxide carbonate from a $Na_2CO_3$ base feed—as will be described later in detail—$CO_2$ is evaporated continuously from the solution. $CO_2$ only evaporates if the temperature during precipitation is sufficiently high and when an appropriate evacuation of $CO_2$ is foreseen, such as by working with an open reactor. If the $CO_2$ evaporation rate is insufficient cobalt carbonate precipitates instead of the desired cobalt hydroxide carbonate, and high quality precursors are not achieved.

In general, for the precipitation reaction, a flow comprising $Na_2CO_3$, a flow comprising $CoSO_4$ or $CoCl_2$, and another flow of dopant source are fed into a reactor under normal to strong agitation. Typically, the agitation is achieved by a rotating impeller or circulating flows. The precipitation reaction can be a batch process or a continuous process where the overflow is circulated back into the reactor. Under normal agitation, the precipitation process is mainly controlled by the following parameters:

Temperature
Residence time
pH
Metal concentration
$CO_3$/Co (or base/acid) molar ratio

After precipitation, the obtained cobalt bearing precursor is separated from the liquid by a suitable separation technique such as filtering, then washed by deionized water. Washing with deionized water can remove a fraction of the sodium impurity from the obtained cobalt baring precursor, but still a quite high amount of impurities remain even after washing with large amounts of deionized water. The obtained cobalt bearing precursor—which still contains some water—is dried in a drying oven at elevated temperature.

It is observed that depending on the above mentioned precipitation process parameters, the precipitated material comprises a cobalt hydroxide carbonate that may be represented by the general formula $Co_2(OH)_2CO_3$, according to the reaction:

$$2CoSO_4+2Na_2CO_3+H_2O \rightarrow Co_2(OH)_2CO_3 \downarrow + 2Na_2SO_4+CO_2 \uparrow \quad (EQ\ 7)$$

Besides this cobalt hydroxide carbonate, the precipitated material can also contain $CoCO_3$, according to the theoretical reaction mentioned before (EQ 6). Nucleation and growth of the precipitated particles is related to the precipitation reaction kinetics. Since large spherical particles having a narrow span can be obtained in this process, it implies that during precipitation, existing particles grow and no or only a small number of new particles are created. Thus the main process is the precipitation of $Co_2(OH)_2CO_3$ onto existing $Co_2(OH)_2CO_3$ particles, resulting in the desired particle growth. The inventors speculate that the precipitation reaction happens in two steps. $CoCO_3$ could precipitate as an intermediate, metastable compound, which then reacts with liquid, and by an ion exchange process results in the hydroxide carbonate compound, according to the following reaction schemes:

$$2CoCO_3+2H_2O \rightarrow Co_2(OH)_2CO_3+H_2CO_3 \quad (EQ\ 8)$$

$$H_2CO_3 \rightarrow H_2O+CO_2 \uparrow \quad (EQ\ 9)$$

The inventors assume that the rate limiting step is the ion exchange reaction (EQ 8). Thus if the temperature is too low or the $CO_2$ is not effectively evacuated, the ion exchange kinetics are negatively influenced and residual $CoCO_3$ remains. If the residual $CoCO_3$ exceeds 50% by weight, the sodium impurity level increases severely and the preferred morphology is not obtained anymore. Only if the cobalt hydroxide carbonate phase dominates, a precursor of high quality is obtained. The reaction in (EQ 7) is promoted by a high temperature during the precipitation process, preferably in a well agitated open-type reactor, so that generated $CO_2$ can easily be removed from the system. It has thus been found that if the base is $Na_2CO_3$, the precipitation needs to be performed at a temperature of at least 70° C., preferably at around 90° C., preferably in an open reactor, to allow the evolution of $CO_2$.

During the precipitation, the flow of base comprises a solution of $Na_2CO_3$. Alternatively, the base can be a mixture of $Na_2CO_3$ and NaOH, where up to 50% of the Na present in $Na_2CO_3$ can be replaced by NaOH. A 50% molar solution ($Na_2CO_3+2NaOH$) does not require the evolution of $CO_2$, following the reaction:

$$2CoSO_4+Na_2CO_3+2NaOH \rightarrow Co_2(OH)_2CO_3+2Na_2SO_4 \quad (EQ\ 10)$$

As the NaOH content in the base flow increases less $CO_2$ needs to evaporate and the precipitation temperature can be lowered.

In order to achieve a complete precipitation of cobalt, it is recommended that the ratio of base to acid is larger than 1. If it is too low, unreacted cobalt remains in the solution. For example, if 100% $Na_2CO_3$ is used, the molar ratio of $CO_3$ to Co should be at least 1. If a 50/50% $Na_2CO_3$/NaOH mixture is used, the ratio of ($CO_3+2OH$) to Co should be at least 1. The $Na_2CO_3$ content in the base should not be below 50% ($CO_3>2OH$). In this case, too much NaOH is present and some of the precipitate will be $Co(OH)_2$ which is undesired.

The base and acid concentration may be sufficient high to achieve a low nucleation rate and a high reactor throughput. If $Na_2CO_3$ is used, a typical concentration is at least 2N, which corresponds to 1 mol $Na_2CO_3$/L, preferably it is at least 3N and most preferably at least 4N. The acid solution is typically at least 2N, corresponding to 1 mol $CoSO_4$/L, more preferably at least 3N and most preferably at least 4N.

The residence time is the time needed to fill the reactor: it is the reactor volume divided by the sum of the feed flow rates. The residence time should be sufficiently high to allow particles to grow into the desired shape. It should not be too high because this would cause a low reactor throughput and more carbonate type precursor formed instead of the desired hydroxy-carbonate.

Homogeneously distributed dopants may play an important role in a cathode material. For example, aluminum significantly suppresses changes in crystal structure of a cathode material when charged to a high voltage, resulting in better stability at such high voltage. The invention discloses that dopants can be co-precipitated during the $Na_2CO_3$ based process by using sulfate solutions such as aluminum sulfate and magnesium sulfate, or suspensions of nano-sized powder. Doping is preferably applied during the precipitation reaction. One embodiment applies nano particle doping. Nano particles can be added as a powder or dispersed into the reactor in a separate feed flow. Alternatively nano particles can be dispersed within the acid or base feed flows. Suitable nano particles are embedded within the growing precipitate particles. Typical examples of nano particles doping are $TiO_2$, $Al_2O_3$, MgO, etc. A typically doping by nano particles is at least 500 mol ppm (amount of metal dopant/transition metal) and not more than 2 mol %. In another embodiment doping is performed by adding a dopant solution to the reactor. Salts of Ni, Mn, Mg or Al can be added as separate feed flows, or they can be part of the acid feed. Typical dopant salts are sulfates, nitrates, etc. Typical doping amounts are at least 0.2 mol % (amount of metal dopant/transition metal) and not more than 5 mol %.

Generally speaking, the possibility of doping an aluminum solution into a cobalt carbonate or a cobalt hydroxide carbonate compound is surprising, as not only 3-valent aluminum is not well-matched on a 2-valent cobalt site, but also aluminum dissolves at high pH, and in general the precipitation reaction requires a high pH. Surprisingly aluminum could be doped, i.e. homogeneously distributed at atomic scale, in a cobalt hydroxide carbonate based cobalt compound by a $Na_2CO_3$ based process with almost no loss of aluminum. Additionally, whereas Mg solution doping is difficult or impossible using a bicarbonate process because of the high solubility of $Mg^{2+}$ at low pH, we observe an easy Mg doping using either the $Na_2CO_3$ based precipitation or the $Na_2CO_3$+NaOH precipitation where the pH is higher.

The cobalt precursor compound obtained by the $Na_2CO_3$ based process under industrial precipitation process conditions contains a high sodium impurity level of 1000 ppm to 3000 ppm. This sodium impurity cannot be removed from the precursor, even not by excessive washing with water. As a high sodium impurity in a cobalt precursor may create undesired phases which are not electrochemically active, this may be a cause of bad electrochemical properties of the cathode material in the final lithium ion battery. LCO— doped or un-doped—which is the cathode material in the lithium ion battery, can be synthesized by a lithiation process of the cobalt hydroxide carbonate based precursor. First, the precursor is mixed with a lithium source—such as lithium carbonate or lithium hydroxide—and certain additives, followed by heating at elevated temperature in an oxygen containing atmosphere, with a suitable heating profile. Finally the sintered material is crushed and sieved. It is expected that the charge and discharge capacities—which are amongst the most important electrochemical properties in a lithium ion battery—decrease as the level of sodium impurity increases. The invention discloses that a sodium impurity can be effectively removed by adding a specific additive before or during lithiation, followed by a heating and washing step. Such additives may be sulfates, such as sodium bisulfate, lithium sulfate, cobalt sulfate, ammonium sulfate, etc. It is important that sufficient sulfate is added so that virtually all sodium is removed in the form of alkali sulfate. As an example—1 mol $NaHSO_4$ can remove 1 mol of Na by washing away $Na_2SO_4$. Similarly 1 mol of Na can be removed as $LiNaSO_4$ by adding 1 mol of $Li_2SO_4$. 2 mols of Na can be removed as $Na_2SO_4$ when adding $CoSO_4$, etc.

Since lithium sodium sulfate is thermodynamically stable, it is formed during lithiation at elevated temperature if a sulfate is added to the cobalt compound, followed by a heat treatment. Therefore, the sulfate can be added during the blending step of the cobalt precursor and the lithium source, and the lithium sodium sulfate is removed by a washing step after firing. Although lithium sulfate and cobalt sulfate are preferred because lithium and cobalt are the main elements in the cathode material, other sulfates such as aluminum sulfate and magnesium sulfate or bisulfates, peroxisulfates etc. can also be a good choice, since some additives deliver positive effects in a cathode material. Alternatively, if a sodium sulfate compound is formed it is water-soluble and can be easily removed by a simple washing step with water.

By applying the technology in this invention: precipitating a cobalt hydroxide carbonate based precursor by a $Na_2CO_3$ based process, and removing the sodium impurity before or during lithiation step, a high quality cathode material which has an improved electrochemical stability and higher energy density can be obtained.

The invention is further illustrated in the following examples:

Description of Analysis Methods

Data about the particle size distribution (PSD) such as D50, D99, and span are preferably obtained by a laser PSD measurement method. In this invention, the laser PSD is measured using a Malvern Mastersizer 2000 with Hydro 2000 MU wet dispersion accessory, after dispersing the powder in an aqueous medium. In order to improve the dispersion of the powder in the aqueous medium, sufficient ultrasonic irradiation and stirring are applied and an appropriate surfactant is introduced. Note that as a narrow span is an indicator of a pronounced sphericity of a particle, the value of the span is used in the Examples to measure sphericity.

The specific surface area is measured with the Brunauer-Emmett-Teller (BET) method using a Micromeritics Tristar 3000. 3 g of powder sample is vacuum dried at 300° C. for 1 h prior to the measurement in order to remove adsorbed species before measurement.

The inductively coupled plasma (ICP) method is used to measure the content of elements such as lithium, cobalt, sodium, aluminum and magnesium by using an Agillent ICP 720-ES. 2 g of powder sample is dissolved in 10 mL high purity hydrochloric acid in an Erlenmeyer flask. The flask is covered by glass and heated on a hot plate for complete dissolution of the precursor. After being cooled to room temperature, the solution is moved to a 100 mL volumetric flask that was 3~4 times rinsed with distilled (DI) water. After filling the flask with the solution, the volumetric flask is filled with DI water up to the 100 mL mark, followed by complete homogenization. 5 mL solution is taken out with a 5 mL pipette and transferred into a 50 mL volumetric flask for a $2^{nd}$ dilution, where the volumetric flask is filled with 10% hydrochloric acid up to the 50 mL mark and then homogenized. Finally, this 50 mL solution is used in the ICP measurement.

The tap density (TD) measurement is carried out by mechanically tapping a graduated measuring cylinder (100 ml) containing sample (having a mass W of around 60-120 g). After observing the initial powder volume, the measuring cylinder is mechanically tapped for 400 times, so that no further volume (V in $cm^3$) or mass (W) change is observed. The TD is calculated as TD=W/V. The TD measurement is carried out on an ERWEKA® instrument.

The XRD measurement is performed with a Rigaku X-Ray Diffractometer (D/MAX-2200/PC) using Cu Kα. The scan speed is set at continuous scanning at 1 degree per minute. The step-size is 0.02 degree. Scans are performed between 15 and 85 degree. Quantitative phase analysis is carried out using a TOPAS software. For the aim of this invention, the peak intensity P1 is defined as the maximum intensity at 34~35 degree (corresponding to the (021) peak of the $Co_2(OH)_2CO_3$ structure) without background subtraction and Peak intensity P2 is defined as the maximum intensity at 32~33 degree (corresponding to the (104) peak of the $CoCO_3$ structure) without background subtraction. The peak ratio P is the ratio of P1 to P2.

Cross section analysis is done by a focus ion beam instrument, which is a JEOL (IB-0920CP). The instrument uses an argon gas as a beam source. A small amount of powder is mixed with a resin and hardener, then the mixture is heated for 10 minutes on a hot plate. After heating, it is placed into the ion beam instrument and the settings are adjusted in a standard procedure, which a voltage is set as 6 kV for 3 hours duration. Scanning Electron Microscopy (SEM) is carried out using a JEOL JSM 7100F scanning electron microscope. The electron microscope is fitted with a 50 mm$^2$ X-MaxN EDS (Energy-dispersive X-ray spectroscopy) sensor from Oxford instruments.

Coin cells that are used in a floating test and for performing a general electrochemical test are assembled by the following steps:

Step 1): preparation of a positive electrode: a slurry that contains the solids: electrochemical active material, conductor (Super P, Timcal) and binder (KF #9305, Kureha) in a weight ratio 90:5:5; and a solvent (NMP, Sigma-Aldrich) is prepared in a high speed homogenizer. The homogenized slurry is spread on one side of an aluminum foil using a doctor blade coater with a 230 µm gap. It is dried in an oven at 120° C., pressed using a calendaring tool, and dried again in a vacuum oven to remove the solvent completely.

Step 2): coin cell assembly: a coin cell is assembled in a glovebox which is filled with an inert gas (argon). For the general electrochemical test, a separator (Celgard) is located between the positive electrode and a piece of lithium foil used as negative electrode. For the floating test, two pieces of separator are located between the positive electrode and the negative material, which consists of graphite. 1M LiPF6 in EC/DMC (ratio 1:2) is used as electrolyte and dropped between separator and electrodes. Then, the coin cell is completely sealed to prevent leakage of electrolyte.

Figure 1:
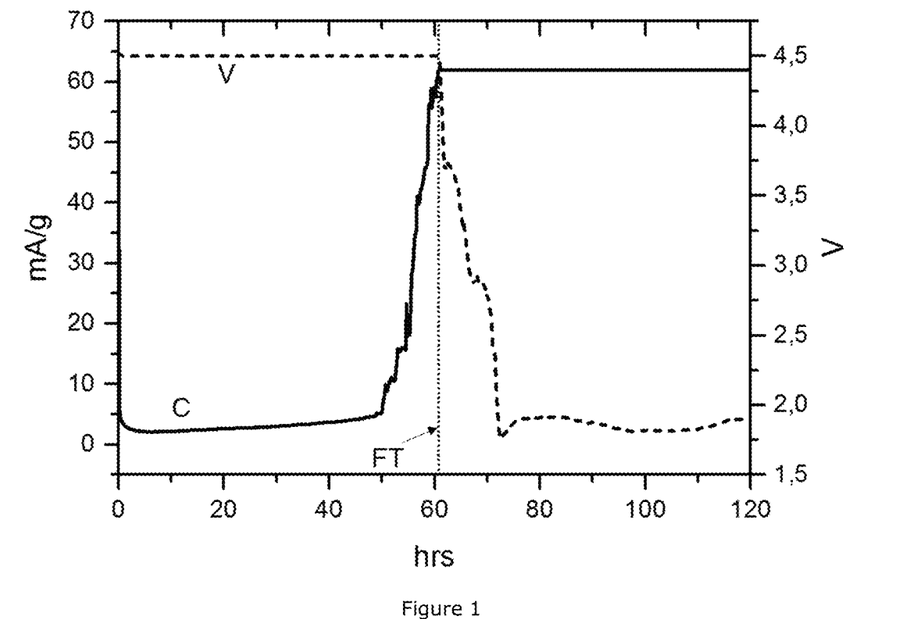
FIG. 1: Typical result of floating test

The floating test analyses the stability of cathode materials at high voltage charging at elevated temperature. The prepared coin cell is tested according to the following charge protocol: the coin cell is first charged to 4.5V at constant current mode and C/20 rate (with 1C=160 mAh/g) in a 60° C. chamber, is then kept at constant voltage (4.5V) for 5 days (120 hours), which is a very severe condition. The maximum current is 1 mA. FIG. 1 displays the results of a typical floating test. First the cathode is charged (data not shown) under CC (constant current) mode. As the final voltage is reached the cell is continuously charged under a constant voltage (CV) mode. The graph shows the recorded current where t=0 is the time were the CV mode charging starts. Once side reactions or metal dissolution happen, there will be a voltage drop. The electrochemical instrument will automatically compensate the (lost) current to keep the voltage constant. Therefore the recorded current is a measure of the ongoing side reactions. As shown in FIG. 1, time (in hours) starts from the beginning of the constant voltage charge, the recorded voltage (V—right axis) and current (mA/g—left axis) are respectively represented by the dashed and solid lines. From the change of current, one can observe the degradation of the tested coin cell at high voltage and temperature. At the end, the current of the coin cell reaches the maximum current (1 mA) and the voltage drops due to short circuiting, where this time is recorded as "failure time" (indicated by FT on the Figure) which is a measure of the high voltage stability and the degree of cobalt dissolution of cathode material. After the floating test, the coin cell is disassembled. The anode and separator close to the anode are analyzed by ICP (inductively coupled plasma) for a metal dissolution analysis, since the prior art described that if metal dissolution happens, the dissolved metal will be deposited on the surface of the anode in metal or metal alloy form. The measured cobalt content is normalized by failure time and total amount of active material in the electrode so that the specific cobalt dissolution value can be obtained.

The general electrochemical test of coin cells comprises two parts as follows: (see also Table 1). Part I is the evaluation of rate performance at 0.1 C, 0.2 C, 0.5 C, 1 C, 2 C and 3 C in the 4.3~3.0V/Li metal window range. The first charge and discharge capacity (CQ1 and DQ1) are measured by constant current mode with 0.1 C rate, where 1 C is defined as 160 mAh/g. A relaxation time of 30 minutes for the first cycle and 10 minutes for all subsequent cycles is allowed between each charge and discharge. The irreversible capacity $Q_{irr}$ is expressed in % as:

$$Q_{Irr.} = \frac{(CQ1 - DQ1)}{CQ1} \times 100(\%)$$

The rate performance at 0.2 C, 0.5 C, 1 C, 2 C and 3 C is expressed as the ratio between the retained discharge capacity DQn, with n=2, 3, 4, 5 and 6 for respectively nC=0.2 C, 0.5 C, 1 C, 2 C and 3 C as follows:

$$nC \text{ rate} = \frac{DQn}{DQ1} \times 100(\%)$$

For example, $$3C \text{ rate (in \%)} = \frac{DQ6}{DQ1} \times 100$$

Part II is the evaluation of cycle life. The charge cutoff voltage is set as 4.6V/Li metal. The discharge capacity at 4.6V/Li metal is measured at 0.1 C at cycles 7 and 31 and 1 C at cycles 8 and 32. Capacity fadings at 0.1 C and 1 C are calculated as follows and are expressed in % per 100 cycles:

$$0.1C \ QFad. = \left(1 - \frac{DQ31}{DQ7}\right) \times \frac{10000}{23} \text{ in \%}/100 \text{ cycles}$$

$$1C \ QFad. = \left(1 - \frac{DQ32}{DQ8}\right) \times \frac{10000}{23} \text{ in \%}/100 \text{ cycles}$$

TABLE 1

Testing protocol of coin cell analysis

| Type | Cycle No | Charge | | | | Discharge | | | |
|---|---|---|---|---|---|---|---|---|---|
| | | C Rate | End current | Rest (min) | V/Li metal (V) | C Rate | End current | Rest (min) | V/Li metal (V) |
| Part I: Rate performance | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II: cycle life | 7 | 0.25 | 0.10 C | 10 | 4.6 | 0.10 | — | 10 | 3.0 |
| | 8 | 0.25 | 0.10 C | 10 | 4.6 | 1.00 | — | 10 | 3.0 |
| | 9-30 | 0.25 | | 10 | 4.6 | 0.50 | — | 10 | 3.0 |
| | 31 | 0.25 | 0.10 C | 10 | 4.6 | 0.10 | — | 10 | 3.0 |
| | 32 | 0.25 | 0.10 C | 10 | 4.6 | 1.00 | — | 10 | 3.0 |

The invention is further illustrated in the following examples:

Example 1

Example 1 is explanatory and discusses the benefits of a well-shaped precursor. The advantages of using large cobalt precursors that have a narrow span are that: 1) a simplified lithiation process is possible, 2) the final cathode material can have a high packing density, and 3) there will be less problems when making a positive electrode using the final cathode material such as less electrode crushing and scratching.

Conventional LCO is generally made from a cobalt precursor that has a small particle size—the median particle size being around 5 µm—and wide span. The particle size of LCO is directly linked to the electrode density, and a median particle size of 15 to 20 µm is a most popular range in conventional LCO. To grow the particle size from 5 µm for the cobalt precursor to 20 µm for the final LCO, either 1) an extremely high energy input is required—by applying a very high heating temperature and/or a very long heating time—or 2) a high lithium to cobalt ratio (Li/Co) is needed. For the second option, since LCO has the best electrochemical properties near its stoichiometric composition, an additional high temperature heating process is required using extra cobalt precursor to adjust the Li/Co ratio to 1. The conclusion is that when a cobalt precursor having a small particle size is used, neither of these two options is efficient at industrial scale in respect of production cost.

Table 2 shows the physical property of LCO as a function of the choice of cobalt precursors having different PSD. CEX1-P is a conventional cobalt precursor (battery grade $Co_3O_4$ from Umicore) which has a small particle size and wide span, while EX1-P is a cobalt precursor ($Co_3O_4$ from Yacheng New Materials) which has a large particle size with narrow span. EX1-C-1, EX1-C-2, CEX1-C-1, and CEX1-C-2 are synthesized in a lithiation process by blending the different cobalt precursors with lithium carbonate for different Li/Co ratios, heating at 980° C. for 10 hours in air atmosphere, crushing by a milling tool, and sieving by an ASTM standard 270 mesh sieve.

TABLE 2

Property of LCO as a function of property of cobalt precursor

| Product ID | Product type | Lithiation condition | | PSD | | | Surface area $m^2/g$ |
|---|---|---|---|---|---|---|---|
| | | Cobalt precursor | Li/Co | D50 µm | D99 µm | Span | |
| EX1-P | Cobalt precursor | | | 18.11 | 31.09 | 0.66 | 4.34 |
| CEX1-P | | | | 3.78 | 10.34 | 1.74 | 1.20 |
| EX1-C-1 | LCO | EX1-P | 1.015 | 18.06 | 38.60 | 0.65 | 0.16 |
| EX1-C-2 | | | 1.030 | 18.59 | 39.35 | 0.66 | |
| CEX1-C-1 | | CEX1-P | 1.035 | 7.06 | 15.96 | 1.04 | 0.30 |
| CEX1-C-2 | | | 1.055 | 17.32 | 51.08 | 1.52 | 0.17 |

A low surface area of LCO can indicate that the internal porosity of LCO is smaller for a comparable PSD. The internal porosity of LCO should be as small as possible to get the highest density of LCO. This is achieved by the long sintering time and high sintering temperature of the lithiation process. It is observed that a higher Li/Co (1.055 for CEX1-C-2) is required to get a similar D50 and surface area when CEX1-P is used, compared to 1.015 for EX1-C-1 using precursor EX1-P. Since it is expected that the electrochemical property of CEX1-C-2—more particularly cycle life—is much worse than that of EX1-C-1, CEX1-C-2 requires the additional high temperature heating step with extra cobalt precursor to decrease Li/Co.

A smaller D99 of the final product, as well as a simplified lithiation process are some of the big advantages when using large spherical cobalt precursors having a narrow span. D99 is a good parameter to estimate the maximum particle size. When D99 is very big, it is expected that there is a problem for the surface quality of the positive electrode since big particle can scratch the electrode surface during the electrode coating process. From this perspective, the ratio D99/D50 of LCO is very important since a lower D99 can limit the need to increase D50, even though a higher D50 is preferable to increase the electrode density. For example, CEX1-C-2 has a much higher D99 than EX1-C-1 in spite of having a similar D50. Therefore, shaped narrow span cobalt precursors—thus having a low D99/D50—can have a high D50 without concerns about the absolute value of D99, resulting in having the possibility to increase the electrode density further by increasing the particle size.

Example 2

Figure 2:
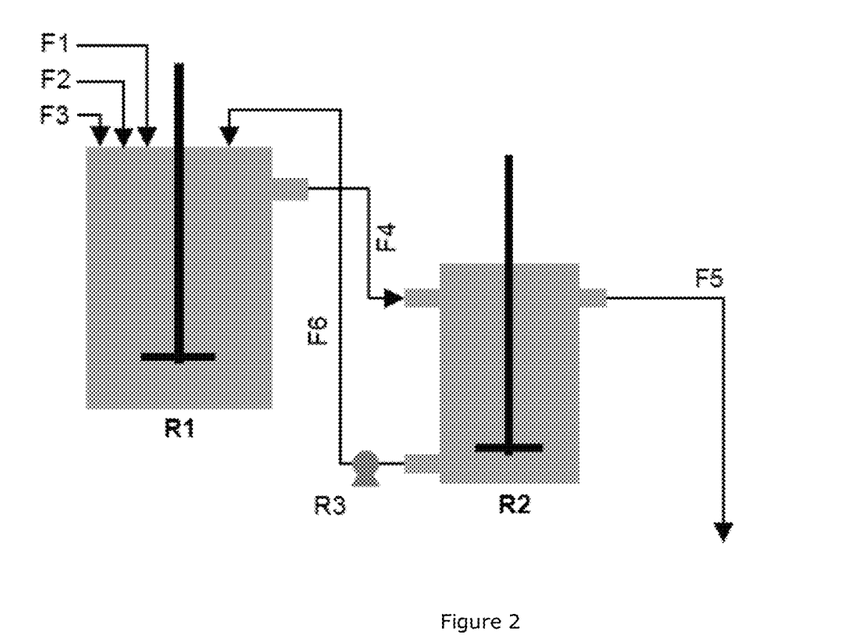
FIG. 2: Schematic illustration of $Na_2CO_3$ based co-precipitation set-up

Example 2 illustrates the $Na_2CO_3$ based co-precipitation process. A schematic illustration of the process is shown in FIG. 2. In FIG. 2, the following is shown:

Flows: F1: dopant; F2: $CoSO_4$; F3: $Na_2CO_3$; F4: Slurry; F5: Clear filtrate out; F6: thickening slurry Apparatus: R1: precipitation reactor; R2: settlement reactor; R3: peristaltic pump $Na_2CO_3$ and $CoSO_4$ solutions with a concentration of 2 mol/L are separately prepared. The precipitation is carried out in a 4 L reactor at elevated temperature (referred to as T1 hereafter) with an impeller stirring speed of 1000 RPM. The $CoSO_4$ solution is pumped first in the reactor for 20 minutes without adding $Na_2CO_3$ solution. Then, more $CoSO_4$ solution is continuously pumped in the precipitation reactor together with the $Na_2CO_3$ solution at double flow rate for 20 minutes. After that (40 minutes in total), the flow rate of $CoSO_4$ and $Na_2CO_3$ solution is kept constant with a $CO_3$/Co molar ratio of 1.08. Two different methods to introduce dopants are used in the invention. One way (referred to as DM1 hereafter) is to dissolve a sulfate—such as aluminum sulfate and magnesium sulfate—in a $CoSO_4$ solution with a certain molar ratio so that the dopant can be injected together with $CoSO_4$. The other way (referred to as DM2 hereafter) is to manually inject a suspension of the dopant directly in the reactor during the precipitation, and a certain amount of the suspension is injected once an hour to get a certain molar ratio of dopant to cobalt. Different from a conventional continuous precipitation process, a first slurry containing precipitated cobalt hydroxide carbonate precursor is discharged from the precipitation reactor through overflow and goes to a second 3 L settlement reactor. In the settlement reactor, the solid precipitate settles down to the bottom since the stirring speed is mild (less than 200 RPM), resulting in a solid-liquid separation. The settled thick slurry at the bottom of the settlement reactor is pumped back into the precipitation reactor. The precipitation is stopped once the particle size of the precipitates in the reactor reaches the target particle size or once the span of the precipitate starts increasing (whichever is first), where the "precipitation time" is defined as the time between starting to inject any solution into the reactor and stopping the precipitation. The precursor is collected by emptying both the precipitation and settlement reactors. Then, a solid-liquid separation of the obtained precursor slurry takes place in a press filter, where the obtained solid is washed with deionized water several times. Finally, the precursor is dried at an elevated temperature to remove any remaining deionized water.

Example 3

Figure 3:
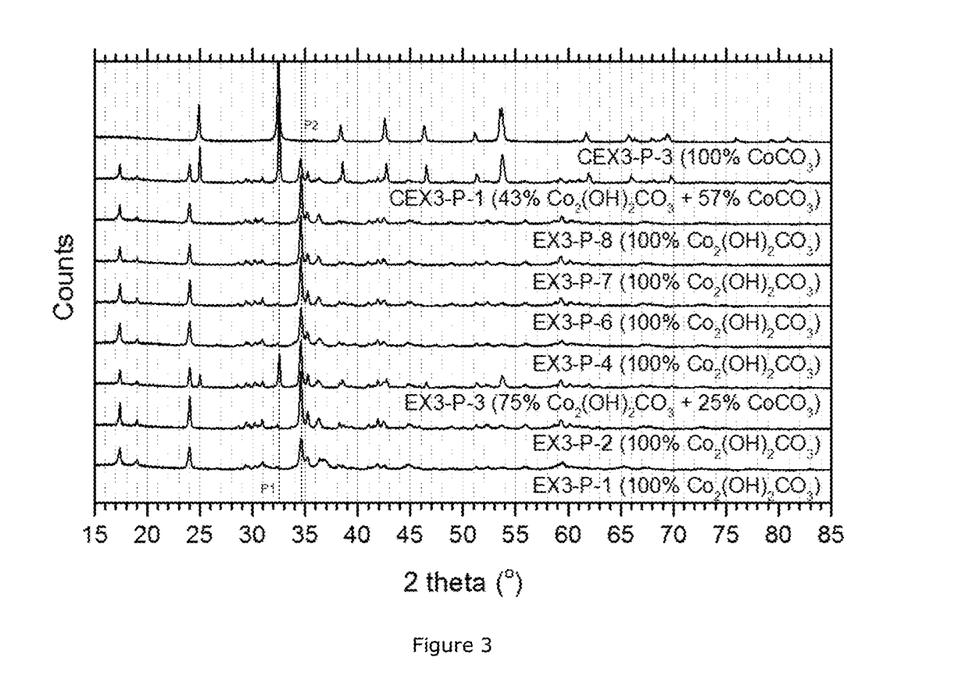
FIG. 3: The XRD patterns of cobalt hydroxide carbonate based cobalt precursors
Figure 4:
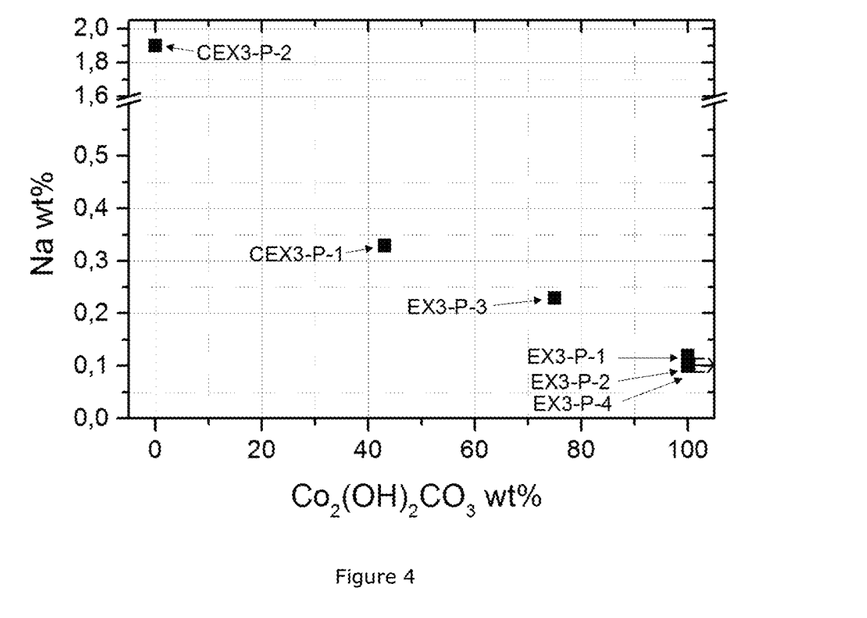
FIG. 4: Relation between the proportion of $Co_2(OH)_2CO_3$ phase and amount of sodium impurity
FIGS. 5a & b: EDS mapping of EX3-P-3

Example 3 describes the doped cobalt hydroxide carbonate precursor compound. Table 3 and FIGS. 3 and 4 show the physical and chemical properties of the precursors, precipitated as described in Example 2, except for EX3-P-6 to 8, CEX3-P-2 and CEX3-P-3. Each precursor is precipitated with different resident and/or total precipitation times to show the influence on the particle size. CEX3-P-3 is a pure cobalt carbonate precipitated by a $NH_4HCO_3$ process without dopant as a control product, where 1.2 mol/L $CoCl_2$ and 2.5 mol/L $NH_4HCO_3$ are used in a 10 L reactor and filtered precipitates are dried at 75° C. The precipitation temperature T1 for CEX3-P-2 and CEX3-P-3 is 60° C. while for the other products it is 90° C.

TABLE 3

Physical and chemical property of cobalt hydroxide carbonate based cobalt precursors

| | | | | PSD | | ICP | | Al/Co | Mg/Co | Ti/Co | XRD Peak ratio P1/P2 | Tap density (g/cm³) |
|---|---|---|---|---|---|---|---|---|---|---|---|---|
| Product ID | Base | T1 (° C.) | Doping method | D50 (μm) | SPAN | Co (wt. %) | Na (wt. %) | (% in mol/mol) | | | | |
| EX3-P-1 | $Na_2CO_3$ | 90 | — | 17.3 | 0.64 | 55.99 | 0.12 | — | — | — | 0.17 | 1.46 |
| EX3-P-2 | $Na_2CO_3$ | 90 | DM1 | 20.7 | 0.64 | 54.06 | 0.10 | 0.92 | — | — | 0.10 | 1.94 |
| EX3-P-3 | $Na_2CO_3$ | 90 | DM2 | 22.9 | 0.67 | 52.33 | 0.23 | 1.21 | — | — | 0.73 | 2.35 |
| EX3-P-4 | $Na_2CO_3$ | 90 | DM1 | 18.5 | 0.76 | 53.64 | 0.10 | 0.98 | 0.95 | — | 0.13 | 1.25 |
| EX3-P-5 | $Na_2CO_3$ | 90 | DM2 | 12.1 | 0.68 | 53.94 | 0.12 | 0.81 | — | 0.49 | — | 1.82 |
| EX3-P-6 | $Na_2CO_3$ + NaOH | 90 | — | 21.3 | 0.62 | 53.00 | 0.09 | — | — | — | 0.09 | 2.17 |
| EX3-P-7 | $Na_2CO_3$ + NaOH | 90 | DM1 | 29.5 | 0.61 | 53.37 | 0.12 | — | 1.00 | — | 0.07 | 2.35 |
| EX3-P-8 | $Na_2CO_3$ + NaOH | 90 | DM1 | 27.9 | 0.68 | 53.95 | 0.13 | — | 1.02 | — | 0.08 | 2.15 |
| CEX3-P-1 | $Na_2CO_3$ | 90 | DM1 | 14.6 | 0.68 | 50.79 | 0.33 | 0.96 | — | — | 3.77 | 2.22 |
| CEX3-P-2 | $Na_2CO_3$ | 60 | — | 14.0 | 1.45 | 59.74 | 1.90 | — | — | — | — | 0.43 |
| CEX3-P-3 | $NH_4HCO_3$ | 60 | — | 20.9 | 0.65 | 46.54 | 0.02 | — | — | — | 33.1 | 2.13 |

| | XRD | | | Precipitation condition | | |
|---|---|---|---|---|---|---|
| | Quantitative phase analysis (%) | | Peak ratio | Base/ acid | RT (hour) | Precipitation time (hour) |
| Product ID | $CoCO_3$ | $Co_2(CO_3)(OH)_2$ | P1/P2 | | | |
| EX3-P-1 | 0 | 100 | 0.17 | 1.08 | 2.74 | 6.0 |
| EX3-P-2 | 0 | 100 | 0.10 | 1.08 | 2.74 | 19.0 |
| EX3-P-3 | 25 | 75 | 0.73 | 1.08 | 2.74 | 58.0 |
| EX3-P-4 | 0 | 100 | 0.13 | 1.10 | 2.74 | 6.0 |
| EX3-P-5 | — | — | — | 1.08 | 2.74 | 13.0 |
| EX3-P-6 | 0 | 100 | 0.09 | 1.08 | 2.74 | 19.0 |
| EX3-P-7 | 0 | 100 | 0.07 | 1.08 | 2.74 | 25.5 |

TABLE 3-continued

Physical and chemical property of cobalt hydroxide carbonate based cobalt precursors

| | | | | | | |
|---|---|---|---|---|---|---|
| EX3-P-8 | 0 | 100 | 0.08 | 1.08 | 2.74 | 30.0 |
| CEX3-P-1 | 57 | 43 | 3.77 | 1.08 | 4.11 | 40.0 |
| CEX3-P-2 | — | — | — | 1.08 | 2.74 | 6.0 |
| CEX3-P-3 | 100 | 0 | 33.10 | | 3.00 | |

The target dopant content for EX3-P-2 to 5, EX3-P-7 to 8, and CEX3-P-1 is 1.0 mol % for Al and Mg, and 0.5 mol % for Ti. The obtained contents (from ICP or EDS analysis) are close to the target, with marginal deviations that can easily be adjusted. It is confirmed that both methods for introducing dopants—dissolving aluminum or magnesium sulfate in the cobalt sulfate solution (DM1) and injecting a suspension of nano-sized dopant into the precipitation reactor periodically (DM2)—work well. All products have a narrow span except CEX3-P-2. EX3-P-6 and EX3-P-7 are precipitated using 90 vol % of 2 mol/L $Na_2CO_3$ solution and 10 vol % of 4 mol/L NaOH solution as a base, and the other process parameters according to Example 2. EX3-P-8 is precipitated using 60 vol % of 2 mol/L $Na_2CO_3$ solution and 40 vol % of 4 mol/L NaOH solution as a base, and the other process parameters according to Example 2. It is observed that EX3-P-6 to 8 which are precipitated by mixtures of $Na_2CO_3$ and NaOH as a base solution have relatively low Na contents compared to other products.

Each product EX3-P-1 to 8 can be used as a cobalt precursor of LCO depending on the characteristic of these products such as PSD, dopants concentration, and tap density. For example, a small fraction of EX3-P-5 which has smaller particle size can be blended as a "filler precursor" with a large fraction of EX3-P-3 as a "coarse precursor" to increase the volumetric powder density of LCO. CEX3-P-2, precipitated at a too low temperature, results in a span and Na content that is too high, and a tap density that is too low. CEX3-P-3 made by the traditional ammonium bicarbonate process results in a very low Na content, low span and high D50, but the morphology of the obtained pure $CoCo_3$ is not good, and this has a negative impact on the final LCO.

The cobalt content and quantitative phase analysis by XRD indicate that all products obtained by the $Na_2CO_3$ based process are composed of cobalt hydroxide carbonate $(Co_2(OH)_2CO_3)$, which belongs to the malachite-rosasite mineral group, and some additionally contain cobalt carbonate. The XRD peak ratio (021) over (104) can be used as a criteria to quantify the relative amount the different crystal structures. The malachite-rosasite mineral group is a monoclinic or triclinic metal hydroxide carbonates with the general formula $A_2(OH)_2CO_3$ or $AB(OH)_2CO_3$, where A and B is either cobalt, magnesium, copper, nickel or zinc, as described in "Fleischer's Glossary of Mineral Species" (J. A. Mandarino, The Mineralogical Record Inc., Tucson, 1999). The crystallography of the cobalt hydroxide carbonate in this invention shows good agreement with that of Pokrovskite as described in "The malachite-rosasite group: crystal structures of Glaukosphaerite and Pokrovskite" (Perichiazzi. N et al., European Journal of Mineralogy, 2006).

FIG. 4 shows the relation between the proportion of the cobalt hydroxide carbonate phase in the precipitate, and the amount of sodium impurity (Na content in wt % obtained by ICP versus $Co_2(OH)_2CO_3$ content in wt % obtained by Rietveld XRD analysis). It is observed that the sodium impurity decreases as the proportion of cobalt hydroxide carbonate phase increases. Both EX3-P-2 and CEX-P-1 are prepared with the same general process parameters (the base/acid molar ratio is the same as the $CO_3$/Co ratio), except for the residence (RT) and precipitation time, where it can be observed that when increasing these times the hydroxy-carbonate phase is converted to the carbonate phase, and the obtained precursor does not permit to achieve the objectives of the invention. In Example 6 the treatment of a high sodium content precursor is described.

Figure 5A:
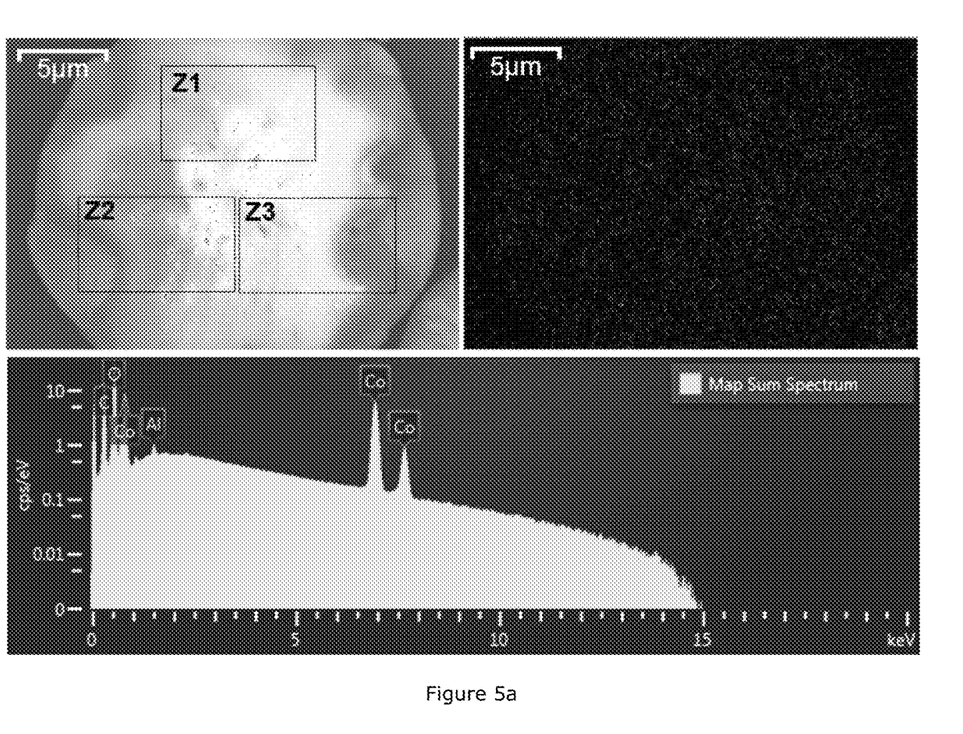
Figure 5B:
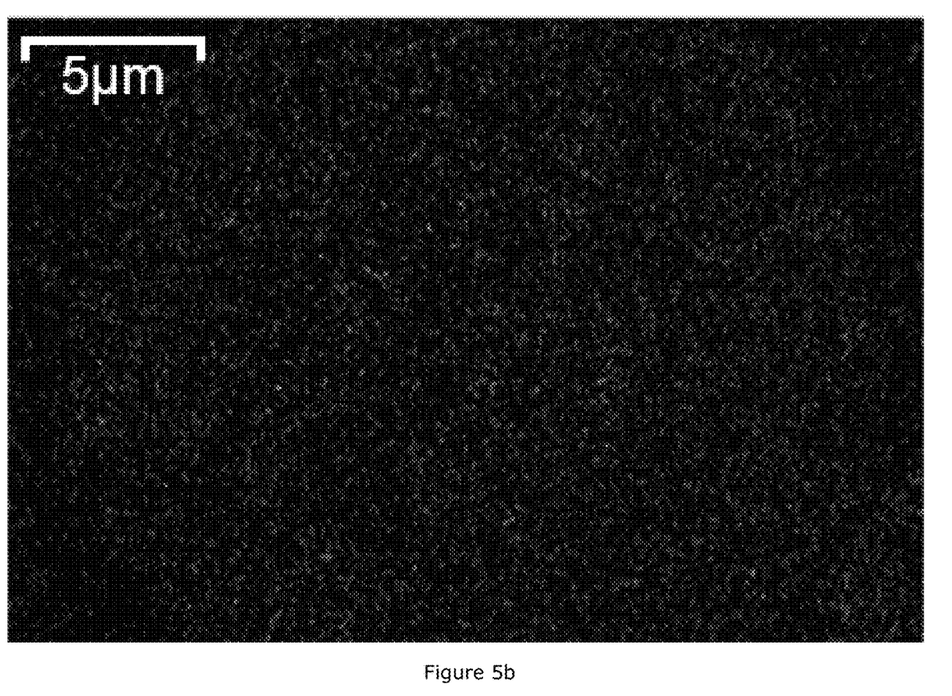

To verify how well Al is distributed in a particle, an EDS (Energy dispersive X-ray spectroscopy) analysis is performed after cutting particles by using the cross section method as described in "Description of analysis methods". The upper left figure in FIG. 5a is a SEM image of a cross section of EX3-P-3 and the upper right figure shows the EDS mapping result of EX3-P-3, where white points indicate a homogeneous presence of Al. An enlarged view of this EDS map is repeated in FIG. 5b. Since there is a clear Al peak in the spectrum, the white points in upper right figure and FIG. 5b are not caused by noise. Three different zones (Z1, Z2, and Z3), as shown in the upper left figure in FIG. 5a, are separately measured by EDS measurements and Table 4 shows the analysis result. Based on the Al contents of these zones and the result of the EDS mapping, it is clear that Al is homogeneously distributed in a particle of EX3-P-3.

TABLE 4

Al contents at different positions, measured by EDS

| Position | Al/Co (% in mol/mol) |
|---|---|
| Z1 | 1.42 |
| Z2 | 1.50 |
| Z3 | 1.43 |

Example 4

Example 4 describes the synthesis of LCO with the precursors of Example 3: EX3-P-3 and CEX3-P-3 are lithiated to form lithium cobalt oxides. These cobalt compounds are blended with lithium carbonate with different lithium to metal (Li/M) ratios, where M is the sum of cobalt and aluminum. Each blend is heated at 1000° C. for 12 hours. Then, the sintered materials are crushed. For improving the electrochemical properties, titanium oxide is blended with the obtained materials and the resulting "second" blends are heated at 750° C. for 6 hours. Table 5 shows the failure time and specific cobalt dissolution from floating test as a function of the type of cobalt precursor and the Li/M molar ratio. For the LCO products made from EX3-P-3, the failure time increases as the Li/M ratio increases. This is because the cobalt dissolution is less due to the presence of more lithium, resulting in a better high voltage stability. The example shows that LCO products made from an aluminum doped cobalt hydroxide carbonate precursor (EX3-P-3) have a much longer failure time and less cobalt dissolution than those from non-doped pure cobalt carbonate produced by the $NH_4HCO_3$ process. Working with a cobalt hydroxide carbonate precursor is thus not only interesting from a cost perspective, but also this Example indicates that the presence of aluminum in LCO is beneficial to have a better high voltage stability.

TABLE 5

Floating test result of aluminum doped LCO and non-doped LCO

| | | | Floating test | |
|---|---|---|---|---|
| Product ID | Precursor | Li/(Co + Al) | Failure time (hour) | Specific Co (mg/g/h) |
| EX4-C-1 | EX3-P-3 | 1.000 | 42.0 | 0.64 |
| EX4-C-2 | | 1.015 | 88.0 | 0.65 |
| EX4-C-3 | | 1.030 | 120.0 | 0.49 |
| CEX4-C-1 | CEX3-P-3 | 0.990 | 30.2 | 1.57 |
| CEX4-C-2 | | 1.010 | 25.2 | 1.06 |
| CEX4-C-3 | | 1.030 | 22.5 | 0.86 |

Specific Co: the measured cobalt content is normalized by failure time and total amount of active material in the electrode so that the specific cobalt dissolution value can be obtained.

Example 5

To identify the need of homogeneous aluminum doping compared to aluminum surface coating on a cobalt precursor, two LCO products are synthesized by using 1) an aluminum doped cobalt hydroxide carbonate based precursor (being EX3-P-3) mixed with 15 wt % of EX3-P-5 as a filler material before lithiation and 2) 1 mol % aluminum oxide coated $Co_3O_4$ precursor (from Yacheng New Materials) mixed with 15 wt % of EX3-P-5 as a filler material before lithiation. This also illustrates that one of the practical uses of large spherical cobalt precursors with narrow span is to increase the packing density by blending with smaller particles so that smaller particles can occupy the voids—as a "filler" material—created by the close packing of the large spherical particles. Then, lithium carbonate is blended with the pre-blended cobalt precursors, where Li/M ratio is 1.005, and the blends are heated at 1000° C. for 12 hours. The obtained materials are crushed and sieved on a 270 mesh sieve. Table 6 shows the floating test results of the LCO products, where EX5-C is produced from an aluminum doped hydroxide carbonate based cobalt precursor and CEX5-C is produced by an alumina coated $Co_3O_4$ precursor. It is observed that EX5-C has a much higher failure time and lower specific cobalt dissolution compared to CEX5-C, indicating that when Al is added, it should be homogeneously distributed in LCO by means of doping, instead of surface coating, to be able to benefit from the positive influence of the dopant on the structural stability of LCO. The difference in Co dissolution is not caused by the difference in nature of the precursor itself (hydroxy-carbonate versus cobalt oxide) since without doping or coating both of these have a similar Co dissolution problem.

TABLE 6

Floating test result of aluminum coated LCO and aluminum doped LCO

| | | Floating test | |
|---|---|---|---|
| Product ID | Large precursor | Failure time (hour) | Specific Co (mg/g/h) |
| EX5-C | Al doped | 76.7 | 0.80 |
| CEX5-C | $Al_2O_3$ coated | 28.5 | 1.06 |

Example 6

In Example 6 the removal of the sodium impurity is illustrated. In Example 3 it was shown that the sodium content of the precursor can be from 0.10% to 0.33%, which may be detrimental for the LCO application. EX4-C-1 and EX4-C-3 are produced from EX3-P-3 which contains 0.23% of sodium. Table 7 shows the sodium content and electrochemical property of EX4-C-1 and 3, measured by the general electrochemical test of coin cells described before. It is observed that the sodium content of LCO products is the same as that of cobalt compounds, indicating that sodium remains after lithiation. Due to the high sodium content, the charge and discharge capacities (CQ1 and DQ1) are lower than expected.

Sodium can be effectively removed by the following procedure during lithiation, and an additional washing process. EX3-P-3 is blended with lithium carbonate and lithium sulfate, where the amount of added lithium sulfate is the same as the amount of sodium:molar ratio Na:$Li_2SO_4$=1:1, and lithium carbonate is added to match the target Li/M ratio (1.00 or 1.03 in this example). Heating and post treatment conditions are same as the conditions of EX4-C-1 and 3, described in Example 4. After the post treatment, the obtained LCO products are washed with water, followed by drying in an oven at elevated temperature after filtering. Finally, two LCO products—EX6-CW-1 and EX6-CW-2—are obtained. As can be seen in Table 7, EX6-CW-1 and 2 have a significantly reduced sodium content, resulting in improved electrochemical property such as CQ1, $Q_{irr}$, DQ1, and 3 C rate, and keeping the same cycle stability.

TABLE 7

Sodium content and electrochemical property of LCO before and after removing sodium impurity

| | | | Coin cell test | | | | | |
|---|---|---|---|---|---|---|---|---|
| Product ID | Li/ (Co + Al) | ICP Na % | CQ1 mAh/g | DQ1 mAh/g | $Q_{irr.}$ % | 3 C rate % | 0.1 C Q fad. %/100 | 1 C Q fad. %/100 |
| EX4-C-1 | 1.00 | 0.24 | 162.6 | 156.0 | 4.0 | 88.6 | 57.0 | 82.9 |
| EX4-C-3 | 1.03 | 0.23 | 160.9 | 148.4 | 7.8 | 81.7 | 64.7 | 89.8 |

TABLE 7-continued

Sodium content and electrochemical property of LCO before and after removing sodium impurity

| | | | Coin cell test | | | | | |
|---|---|---|---|---|---|---|---|---|
| Product ID | Li/ (Co + Al) | ICP Na % | CQ1 mAh/g | DQ1 mAh/g | $Q_{irr.}$ % | 3 C rate % | 0.1 C Q fad. %/100 | 1 C Q fad. %/100 |
| EX6-CW-1 | 1.00 | 0.01 | 163.7 | 158.9 | 2.9 | 92.4 | 62.4 | 86.5 |
| EX6-CW-2 | 1.03 | 0.01 | 162.7 | 157.5 | 3.2 | 88.6 | 53.3 | 84.9 |

The invention claimed is:

1. A cobalt based hydroxide carbonate compound, having a crystal structure and the general formula $[Co_{1-a}A_a]_2(OH)_2CO_3$, A being one or more of Ni, Mn, Al, Ti, Zr and Mg, with $a \leq 0.05$, wherein A is distributed in the crystal structure of the cobalt based hydroxide carbonate compound.

2. The cobalt based hydroxide carbonate compound of claim 1, further comprising Na as an impurity of up to 0.3 wt %.

3. The cobalt based hydroxide carbonate compound of claim 1, having a particle size distribution with D50 between 15 and 25 μm and a span <0.80.

4. The cobalt based hydroxide carbonate compound of claim 1, wherein the compound has a spherical morphology and a tap density >1.8 g/cm$^3$.

5. The cobalt based hydroxide carbonate compound of claim 1, wherein A is one or both of Al and Mg, with $0.002 \leq a \leq 0.020$, and wherein one or both of Al and Mg is homogeneously doped in the compound.

6. A Li-containing cathode active material powder prepared from a cobalt based hydroxide carbonate compound, having the general formula $[Co_{1-a}A_a]_2(OH)_2CO_3$, A being one or more of Ni, Mn, Al, Ti, Zr and Mg, with $a \leq 0.05$.

7. A method for manufacturing a cobalt based hydroxide carbonate compound, having a crystal structure and the general formula $[Co_{1-a}A_a]_2(OH)_2CO_3$, A being one or more of Ni, Mn, Al, Ti, Zr and Mg, with $a \leq 0.05$, wherein A is distributed in the crystal structure of the cobalt based hydroxide carbonate compound, the method comprising the steps of:
   providing a first aqueous solution comprising a source of Co,
   providing a second aqueous solution comprising $Na_2CO_3$,
   mixing both solutions in a precipitation reactor at a temperature above 70° C., thereby precipitating a cobalt based hydroxide carbonate compound whilst evacuating from the reactor any $CO_2$ formed by the precipitation reaction, wherein the residence time of the compound in the reactor is between 1 and 4 hours, and recovering the cobalt based hydroxide carbonate compound.

8. The method according to claim 1, wherein the second aqueous solution comprises:
   a solution of at least 2N $Na_2CO_3$, or
   a solution comprising between 0.5 and 3 mol/L of $Na_2CO_3$ and between 1 and 6 mol/L NaOH, wherein the Na content in the $Na_2CO_3$ is as high or higher than twice the Na content in the NaOH.

9. The method according to claim 1, wherein the first aqueous solution further comprises a source of one or more of Ni, Mn, Al, Mg and Ti.

10. The method according to claim 1, wherein the first solution comprising a source of Co comprises $CoSO_4$, and further comprises one or more of $MgSO_4$, $Al_2(SO_4)_3$, $NiSO_4$ and $MnSO_4$, wherein one or more of Mg, Al, Ni and Mn are present in a molar ratio versus the Co content of between 0.2 and 5 mol %.

11. The method according to claim 1, wherein during the step of mixing both solutions a nanometric powder comprising one or more of $TiO_2$, MgO or $Al_2O_3$ is added.

12. The method according to claim 1, further comprising, after the precipitating step, transferring the compound from the precipitating reactor to a settlement reactor coupled to the precipitating reactor, wherein a solid precipitate of the compound settles to the bottom of the settlement reactor, and whereafter the settled solid precipitate of the compound is recirculated to the precipitation reactor.

13. A method for manufacturing a lithiated cobalt based oxide, comprising the steps of claim 1, and subsequently additionally comprising the steps of:
   mixing the cobalt based hydroxide carbonate compound with a source of Li, and
   sintering the mixture at a temperature above 950° C. in an oxygen containing atmosphere.

14. The method according to claim 13, wherein the precipitated cobalt based hydroxide carbonate compound comprises Na as an impurity between 0.1 and 0.3 wt %, and wherein either:
   during the step of mixing the cobalt based hydroxide carbonate compound with the source of Li, or
   during the step of sintering the mixture;
adding a sulfate compound, whereby the molar quantity of $SO_4$ is equal to or higher than the molar content of Na, and subsequently comprising the step of washing the lithiated cobalt based oxide with water, and drying the lithiated cobalt based oxide.

15. The method according to claim 14, wherein the sulfate compound is one of $Li_2SO_4$, $NaHSO_4$, $CoSO_4$ and $Na_2S_2O_8$.

* * * * *

UNITED STATES PATENT AND TRADEMARK OFFICE
CERTIFICATE OF CORRECTION

PATENT NO. : 11,189,832 B2  
APPLICATION NO. : 16/568756  
DATED : November 30, 2021  
INVENTOR(S) : Dae-Hyun Kim et al.

Page 1 of 1

It is certified that error appears in the above-identified patent and that said Letters Patent is hereby corrected as shown below:

In the Claims

Column 21, Claim 8, Line 1, should read as: "The method according to claim 7, wherein the second..."

Column 22, Claim 9, Line 1, should read as: "The method according to claim 7, wherein the first..."

Column 22, Claim 10, Line 1, should read as: "The method according to claim 7, wherein the first..."

Column 22, Claim 11, Line 1, should read as: "The method according to claim 7, wherein during the..."

Column 22, Claim 12, Line 1, should read as: "The method according to claim 7, further comprising,..."

Column 22, Claim 13, Line 2, should read as: "...oxide, comprising the steps of claim 7, and subsequently..."

Signed and Sealed this  
Fifteenth Day of March, 2022

Drew Hirshfeld  
*Performing the Functions and Duties of the  
Under Secretary of Commerce for Intellectual Property and  
Director of the United States Patent and Trademark Office*